April 9, 1940.  H. L. LESTER  2,196,561
BUMPER EXTENSION FENDER GUARD
Filed Oct. 24, 1938

Hampton L. Lester
INVENTOR
BY Victor J. Evans & Co.
ATTORNEYS

Patented Apr. 9, 1940

2,196,561

UNITED STATES PATENT OFFICE 2,196,561

BUMPER EXTENSION FENDER GUARD

Hampton L. Lester, Charleston, W. Va.

Application October 24, 1938, Serial No. 236,711

3 Claims. (Cl. 293—55)

This invention relates to attachments for motor vehicle bumpers and has for the primary object the provision of an efficient and inexpensive means of the above stated character which may be easily and quickly installed on a bumper to increase the protection of the latter to the motor vehicle and especially the fenders of said motor vehicle and may be readily adjusted endwise of said bumper when desired.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a front elevation showing a motor vehicle and its front bumper equipped with the present invention.

Figure 1:
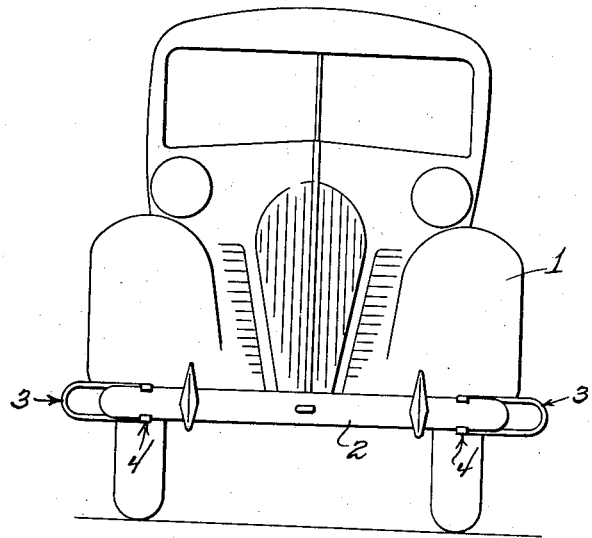
Figure 2:
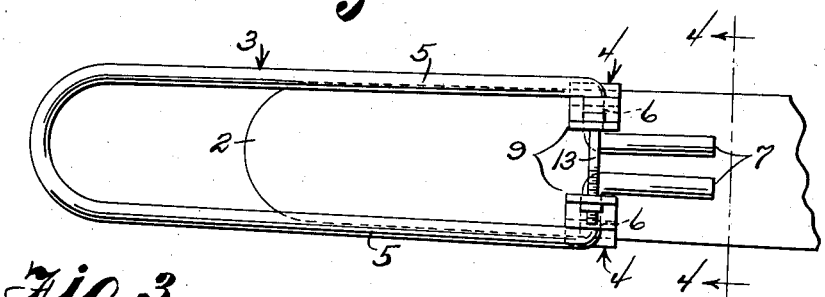
Figure 2 is a fragmentary rear elevation of a portion of the bumper showing the attachment mounted thereon.
Figure 3:
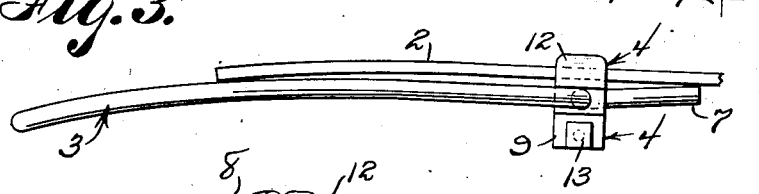
Figure 3 is a fragmentary top plan view showing the attachment applied to one of the ends of the bumper.
Figure 4:
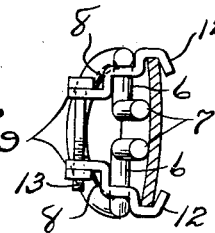
Figure 4 is a transverse sectional view taken on line 4—4 of Figure 2.

Referring in detail to the drawing, the numeral 1 indicates a motor vehicle and 2 a bumper therefor. In present day motor vehicle construction the length of the bumper is less than the distance between the outer edges of the fenders, consequently portions of the fenders are non-protected by the bumpers. To give the fenders full protection by the bumper, attachments 3 are mounted on the bumper adjacent the ends for the purpose of increasing the overall length of the bumper and thereby afford full protection for the fenders. The attachments are mounted on the bumper 2 by sectional clamps 4 permitting the attachments to be adjusted endwise of the bumper. Each attachment consists of a bar bent to form an elongated loop member 5 the distance between its upper and lower runs being less than the width of the bumper so that the upper and lower runs abut against one face of the bumper. The bar after being bent to form the elongated loop portion is bent to provide bracket engaging portions 6 extending at right angles to the upper and lower runs and opposing each other and terminating in parallel portions 7 to contact the rear face of the bumper. The parallel portions 7 and the upper and lower runs of the elongated loop portion engaging the rear face of the bumper will prevent the attachment from swinging relative to the bumper. The clamp engaging portions 6 extend through openings in sections of the clamp. Each section of the clamp is composed of angularly related portions 8, an attaching ear 9 and a hook-shaped portion 12. The hook-shaped portions 12 of the sections of the clamp engage opposite edges of the bumper and the attaching ears 9 are adjustably connected by a tie bolt 13. The portions 6 of the attachment extend through openings formed in certain of the angularly related portions 8 of the sections of the clamp.

The tie bolts 13 of the clamps permit the latter to be easily adapted to and adjusted on the bumper. The clamps being adjustable on the bumper permit the attachments to be adjusted endwise of the bumper.

What is claimed is:

1. Extensions for vehicle bumpers comprising clamps each including separable sections to engage opposite edges of a bumper, a tie bolt connecting the sections of each clamp, guard members carried by the sections of the clamps in abutting relation with the rear face of the bumper and extending therebeyond, each guard member including a member bent into an elongated loop formation with its end portions bent to extend toward each other and received by the sections of the clamps and bent angularly thereto to define spaced parallel extensions engageable with the rear face of the bumper at opposite sides of the clamps from the location of the guard members to securely hold the guard member immovably associated with the bumper.

2. A bumper extension and fender guard for automotive vehicles comprising a substantially U-shaped guard member mounted on the said bumper with the spaced arm portions abutting the inner face of the bumper and with the closed end thereof extending longitudinally of the bumper and terminating exteriorly of the compass of the vehicle body and forwardly of the fender, and means connected to the guard member to prevent the same from moving in a direction away from the said bumper.

3. A bumper extension and fender guard for automotive vehicles comprising a substantially U-shaped guard member positioned with the spaced arm portions abutting the inner face of the bumper and with the closed end thereof extending longitudinally of the bumper and terminating exteriorly of the compass of the vehicle body and forwardly of the fender, the free ends of the said guard member being bent toward each other, clamp means carried by the bumper and pivotally receiving the inwardly disposed ends of the guard member, and longitudinal extensions integral with the angularly bent ends of the guard members, said extensions engaging the inner face of the bumper at a point sufficiently spaced from the said clamp means to prevent the guard member from pivoting toward the body of the vehicle, said bumper preventing movement thereof in a direction away from the body of the vehicle.

HAMPTON L. LESTER.